May 6, 1958  V. P. OWENS  2,833,619
METHOD AND APPARATUS FOR CONTROLLING THE CONCENTRATION
OF LIQUORS FROM EVAPORATORS
Filed Sept. 24, 1952

INVENTOR
Vincent P. Owens
BY
*C. H. Bryant*
ATTORNEY

2,833,619

Patented May 6, 1958

2,833,619

METHOD AND APPARATUS FOR CONTROLLING THE CONCENTRATION OF LIQUORS FROM EVAPORATORS

Vincent P. Owens, Fairlawn, N. J., assignor to Combustion Engineering, Inc., New York, N. Y., a corporation of Delaware Application September 24, 1952, Serial No. 311,176

16 Claims. (Cl. 23—48)

This invention relates generally to evaporators for concentrating liquors by direct contact of the liquor with hot gases and has specific reference to improved means to control the concentration of the liquor and the temperature of the hot gases as they each leave the evaporator.

This invention constitutes an improvement over the organization of my U. S. Patent No. 2,258,467, issued October 7, 1941, and is particularly useful in combination with apparatus for the recovery of heat and chemicals from black liquors produced in the alkaline pulping process cooperating with said apparatus to improve the control of the concentration of the liquor delivered to and burned in the recovery furnace forming a part of such apparatus.

The invention may also be applied to the control of concentrations of waste liquor from the acid pulping process, of molasses slops, juice concentrates, or any liquor to be concentrated for preparation for burning or for further processing.

In the recovery of heat and chemicals from black liquors, the apparatus of the recovery unit includes in general, an evaporator of the kind mentioned above for removing water from the black liquor, a recovery furnace for burning of the black liquor and recovering chemicals therein and a steam generator associated with and receiving its heat from said furnace.

The primary object of the invention is the provision of improvements whereby the recovery unit is maintained efficiently self-sustaining despite varying operating conditions.

Another object is to provide an evaporator wherein hot gases directly contact the material being evaporated with improved means to control the concentration of the liquor leaving the evaporator and to maintain the temperature of the heating gases leaving the evaporator above that at which condensation will occur.

Additional objects and advantages will become apparent from the following description of the illustrative embodiment of the invention when read in conjunction with the accompanying drawings, wherein.

Figure 2:
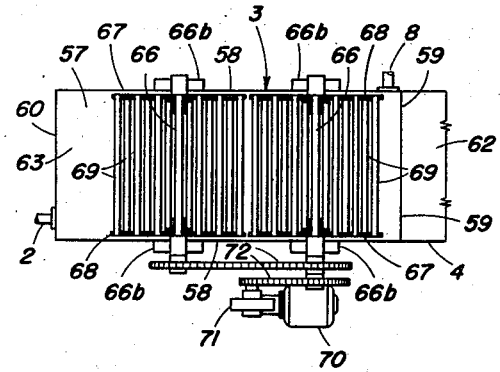
Fig. 2 is a sectional view taken generally along line 2—2 of Fig. 1 showing the construction of the evaporator wheels and the drive means therefor.
Figure 1:
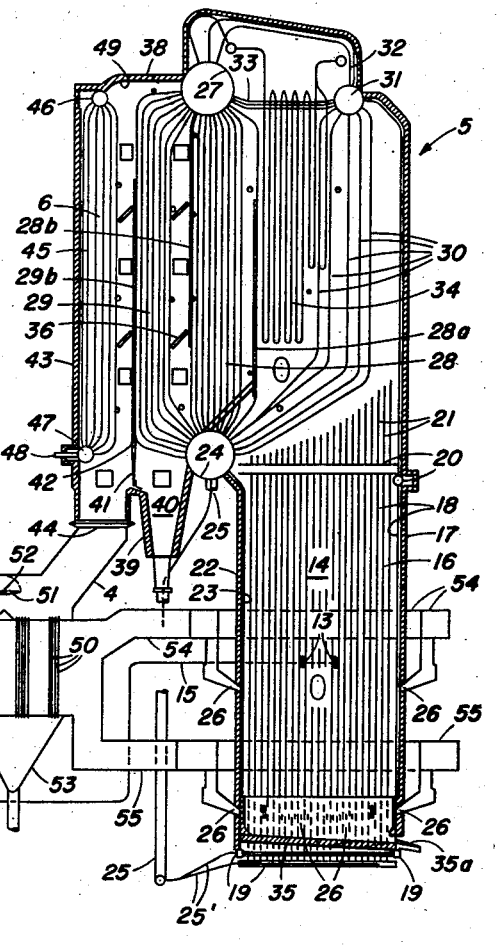
Fig. 1 is a vertical sectional view of a unit for the recovery of heat and chemicals from black liquor showing an application of the improved evaporator.

Referring now to the drawings wherein like reference characters are used throughout to designate like parts, black liquor is introduced into evaporator 3 through conduit 2 from a suitable source (not shown) such as multiple effect evaporators customarily employed with recovery units. At its point of introduction this liquor has a concentration of approximately 45 to 55% solids. During its progression through evaporator 3 from the inlet 2 to the outlet 8 the liquor is brought into contact with a stream of hot gas flowing through the evaporator, said gases being introduced thereinto through conduit 4 from boiler 5 and leaving through outlet 63. By means of this contact a portion of the water contained in said liquor is removed therefrom after which the liquor, now of increased solid concentration, flows through outlet 8 into salt cake mixing tank 9 where additional salts may be added.

This high concentration liquor under pressure of a pump 10 and heated by heaters 11 and 12 is conveyed from tank 9 to the nozzles 13 of the recovery furnace 14 by means of pipes 15. Said nozzles, operating under approximately 15 to 35 pounds per square inch pressure with a liquor temperature of between 220° and 240° F., spray the liquor into the furnace where it is burned with the hot combustion gases thus formed passing upwardly and the chemicals settling to the bottom in a molten state.

Furnace 14 has its two side walls 16 (only one of which appears in the drawing) and its front wall 17 lined with closely spaced upright steam evaporating tubes 18 connected at their lower end into bottom headers 19 and at their upper end into upper headers 20 which are in turn connected into the circulation system of boiler 5 by means of upcomers 21. The rear wall 22 of furnace 14 is lined with similar closely spaced upright steam evaporating tubes 23 connected at their lower end into a lower header 19 and at their upper end into the bottom drum 24 of the boiler 5. Downcomer 25 and connecting conduits 25' supply water from drum 24 to headers 19.

Preheated air in amounts sufficient to support combustion is introduced into the furnace 14 as by means of a plurality of air inlets 26 and in order to collect and drain off the molten chemicals which are produced as a result of burning the black liquor, furnace 14 is provided with a refractory lined bottom 35 having a drain spout 35a.

Waste heat boiler 5, previously referred to, comprises in general the lower drum 24 and an upper drum 27, interconnected by a front bank of upright boiler tubes 28 and a rear bank of upright boiler tubes 29. A plurality of widely spaced upright boiler tubes 30 interconnect the lower drum 24 with an upper drum 31 which is spaced horizontally from the upper drum 27. Circulation tubes 32 and 33 interconnect the two upper drums 31 and 27 thereby completing the boiler circulation system. A superheater 34 is located in the space between the banks of boiler tubes 28 and 30.

A baffle 28a located at the front portion of the front bank of boiler tubes 28 extends upwardly from the lower drum 24 to a point somewhat below the upper drum 27 and a baffle 28b located at the rear portion of said front bank of boiler tubes 28 extends downwardly from the upper drum 27 to a point somewhat above the lower drum 24. Laterally extending baffle plates 36 extend from the baffle 28b to the front tubes of the rear bank of boiler tubes 29 and a rear baffle 29b is provided at the rear of said rear bank of boiler tubes 29. This rear baffle 29b terminates at its upper end at a point below the upper sheathing wall 38 and is spaced at its bottom end from the rear wall 39 of hopper 40 with a damper 41 hinged at 42 controlling the amount of gases passing thereunder. Rear sheathing 43 is provided to form the conduit or connection leading from the opening above baffle 29b to the inlet 44 of the duct 4. A bank of tubes 45 connected into upper and lower drums 46 and 47, respectively, serve as an economizer 6, the feed water entering drum 47 through pipe 48 and the heated water flowing from drum 46 via tubes 49 to steam drum 27.

The baffling referred to provides a plurality of passages for the gases through the boiler unit it being noted that the hot gases enter at the top of the front bank 28 for downward flow thereover, and then pass in upward flow over the rear bank 29 for exit through the opening above baffle 29b from whence they are led through the economizer 6 and duct 4 into the evaporator 3.

The temperature of the waste gases entering the evaporator after passing through the gas passages in normal flow and at normal load is such that liquor introduced into the evaporator at a given concentration of about 45 to 55% of solids will be increased in the evaporator to a concentration of approximately 65 to 70% of solids for introduction into the furnace thereby maintaining such a balance of drying and burning that the unit will be self-sustaining, i. e., no additional fuel will be required.

In order to prevent furnace 14 from becoming wet and inoperative in the event that the waste liquor being supplied to the evaporator 3 drops below the aforesaid given concentration of about 45 to 55% of solids as, for example, would be the case if there was an unbalancing of the multiple effect evaporators usually associated with the system, means are provided for supplying gases of higher temperature to the evaporator whereby this lower density liquor is increased to the high value above mentioned which is necessary for self-sustaining operation of the unit.

This temperature control means comprises the damper 4 whereby a controlled amount of hot gases may be passed from the bottom of tube bank 29 directly into the duct 4. These gases, which will have by-passed the tube bank 29 and the economizer 6 will raise the average temperature of the gases flowing through the duct 4 to the evaporator 3. The aforementioned temperature controlled means is similar to that shown and described in my hereinbefore identified Patent No. 2,258,117.

Optionally an air heater 7 may be provided in the place of or in addition to the economizer 6, said heater comprising conduits 50 through which all or a portion of the gas flowing through duct 4 may be passed. By means of a damper 51 pivoted at 52, at about the middle of the air heater, all or part of the gases flowing through duct 4 may be directed downwardly through the conduits 50 of the right hand portion of the air heater 7 through the hoppers 53 and thence upwardly through the conduits 50 of the left hand portion of said air heater. The air for combustion passes over the conduits 50 and thence flows via ducts 54 and 55 to the air nozzles 26 for introduction into furnace 14. Obviously, the more gases that flow past the damper 51 and air heater 7 through the duct 4 the hotter will be the average temperature of the gases entering the evaporator 3 and the colder will be the air temperature at the furnace nozzles 26.

In the embodiment illustrated, the evaporator 3 comprises an elongated chamber having a top 56, bottom 57, sides 58 (of which there are two) and ends 59 and 60. The bottom portion of the chamber is constructed to form a liquid retaining tank for the retention of black liquor 61 with the liquor being supplied thereto through pipe 2 and removed through pipe 8 as aforesaid. The end 59 has an inlet opening 62 for the inflow of heating gases supplied through duct 4 which is connected thereto. Adjacent the other end 60 is a gas outlet 63 for the outflow of the gases into flue 64 which conducts the gases to the induced draft fan 65. Shafts 66 project through the sides of the evaporator and support evaporating wheels generally designated 67, two such shafts and wheels being here shown. Each of the wheels 67 comprise discs 68 parallel to and closely adjacent the sides 58 with a multiplicity of members, here shown as round bars or pipes 69, being disposed between and fastened to said discs to rotate therewith. These pipes 69 successively dip into the liquor 61 and pass through the chamber above the liquor through which the hot combustion gases flow causing a portion of the water contained in the liquor clinging to the bars 69 to be evaporated. Shafts 66 are suitably journaled in bearings 66b and are rotated by motor 70 through reduction gearing 71 and chains 72.

The top 56 of evaporator 3 is spaced a substantial distance above the periphery of each wheel 67 and adjustable dampers 73, here shown as hinged adjacent said top 56 and occupying a closed position, may be adjusted to cause a portion of the heating gases to pass above the wheels thereby causing the remaining portion of the gases to pass through the wheels 67 flowing over the bars 69.

There is sufficient space between the top of the wheels 67 and the top 56 of the chamber to by-pass a certain percentage of the gases. With the dampers 73 open, there will be practically no drop in temperature of the by-passed gases and the velocities of the remaining gases passing over the surface of the members 69 of wheels 67 will be relatively low, resulting in a lower heat transfer for evaporating the liquid from said members. In this manner the evaporating capacity of the evaporator 3 may be controlled by the use of the dampers 73. When a maximum evaporating capacity is desired the dampers 73 are in closed position as shown, and substantially all of the gases will pass through the wheels 67. As well as controlling evaporation, these dampers afford a means for controlling a minimum average temperature of the gases leaving the evaporator, which is desirable in order to limit condensation upon the flue 64 and the induced draft fan 65.

When operating conditions are the same as design conditions, there is no need for by-pass dampers 73 and the top 56 of the evaporator chamber could, as heretofore, be placed close to the periphery of the wheels 67. However when operating conditions vary from design conditions, as is more the rule than the exception, the by-pass dampers 73 are required to give the necessary control to obtain the desired evaporator outlet gas temperature of between 275 and 300° F. Furthermore, when operating conditions differ from design conditions, the evaporator by-pass dampers 73 are necessary for obtaining the desired evaporation in the evaporator. If evaporation capacity is too low, the resulting concentration of the liquor supplied to the furnace is low and furnace operation becomes critical. If the evaporation is too high, it heretofore became necessary to use water for dilution of the concentrated liquor in the evaporator. The improved evaporator 3 affords a control, by means of the adjustment of dampers 73, by which these objectionable conditions are overcome.

The improved evaporator 3 may be advantageously used in cooperation with the boiler by-pass damper 41, and, if an air heater is used, in cooperation with the air heater damper control.

There are two extreme conditions that can occur in operation of the evaporator. The first condition results when the liquor densities are too low. In this case, the boiler by-pass damper 41 is opened thereby increasing the temperature of gases flowing to the evaporator 3. Under such conditions, without any by-pass damper control in the evaporator, the temperature of gases leaving the evaporator would undesirably increase thereby lowering the overall efficiency of the recovery unit. If under these conditions the evaporator by-pass dampers 73 are closed to decrease the exit gas temperature, this closing will increase the evaporating capacity of the evaporator which is also desired under the circumstances. Thus with the combination of damper 41 and by-pass dampers 73 an improved control is obtained whereby both the amount of evaporation and temperature at the outlet of the evaporator can be controlled.

The second condition that can exist is when the liquor densities to the exaporator are high and less evaporating capacity is required by the evaporator 3. Such a condition may occur at low ratings of the unit where the concentration of the liquor obtained from the multiple effect evaporators increases. Under these conditions the boiler by-pass damper 41 will be completely closed causing a lowering of the temperature of the gases flowing to the evaporator. Lower temperatures to the evaporator without any by-pass or control dampers 73, will result in an undesirably low gas temperature leaving the evaporator. If the evaporator outlet gas temperature falls below 275° F., there is danger of condensation in the induced draft fan breaching and any electrical precipitator, when installed, downstream of the evaporator. This condition is critical because of the high moisture content of the flue gases. If under these conditions the evaporator by-pass dampers 73 are opened, the temperature of gases leaving the evaporator can be held up to the required 275° F. and the evaporating capacity of the evaporator decreased as is required.

Air heater 7 may be used in conjunction with or may replace the economizer 6, in which case the air heater by-pass damper 51 may supplement or replace in function the by-pass damper 41. For certain conditions, it may be desirable to use both the economizer and air heater in a recovery unit and in such case both or either of the dampers 41, 51 may be advantageously used in combination with the dampers 73.

It is thus seen that by-pass dampers 73 together with by-pass dampers 41 and/or 51 produce an improved control of both the concentration of the liquor delivered to the furnace and the temperature of the gases leaving the evaporator which heretofore was not obtainable.

While I have illustrated and described a preferred embodiment of my invention it is to be understood that such is merely illustrative and not restrictive and that variations and modifications may be made therein without departing from the spirit and scope of the invention, I therefore do not wish to be limited to the precise details set forth but desire to avail myself of such changes and alterations as fall within the purview of my invention.

I claim:

1. The method of recovering chemicals from black liquor in a recovery unit including a furnace, boiler and waste heat evaporator, comprising the steps of normally supplying black liquor of given low solid concentration to said waste heat evaporator; increasing the concentration of said black liquor in said evaporator to a given high value by normally delivering waste gases from said recovery furnace and boiler to said evaporator after said waste heat gases have passed over and among the heat absorbing surfaces of said boiler and passing said gases through said evaporator where a portion thereof contact the black liquor therein picking up moisture therefrom; delivering said high concentration liquor into said recovery unit and boiler at a given rate; and maintaining the concentration of the liquor leaving said evaporator and being delivered into said furnace substantially constant and the temperature of the gases as they leave the evaporator within predetermined limits when the liquor supplied to the evaporator drops below said given low concentration by controllably by-passing hot waste gases in said boiler to increase the temperature of the waste gases delivered to said evaporator and by controllably directing a relative greater portion of said gases passing through the evaporator into contact with the black liquor therein to thereby reduce the temperature of said gases prior to their egress from the evaporator thereby improving the overall efficiency of the recovery unit.

2. The method of recovering chemicals from black liquor in a recovery unit including a furnace, boiler and waste heat evaporator, comprising the steps of normally supplying liquor at a given low solid concentration to said waste heat evaporator; increasing the concentration of said black liquor in said evaporator to a given high value by normally delivering waste heat gases from said recovery furnace and boiler to said evaporator after said waste heat gases have passed over and among the heat absorbing surfaces of said boiler; delivering said high concentration liquor into said recovery furnace and boiler at a given rate; and maintaining the concentration of the liquor leaving said evaporator and being delivered into said furnace substantially constant and the temperature of the gases as they leave the evaporator above a predetermined value when the liquor supplied to the evaporator rises above said given low concentration by controllably directing a greater proportion of the hot waste gases through all of the boiler gas passes to decrease the temperature of the waste gases delivered to said evaporator and by controllably directing a relatively greater proportion of the gases passing through the evaporator so that they by-pass the liquor therein to increase the temperature of the gases as they leave the evaporator so that condensation of said gases will not occur in the apparatus following said evaporator.

3. In a chemical recovery unit of the type described the combination of a boiler provided with a furnace, adjustable baffle means within the boiler effective to regulate within limits the temperature of the hot combustion gases leaving said boiler, means for supplying a moisture containing fuel to said furnace including a direct contact evaporator effective to decrease the moisture content of said fuel, said evaporator having an inlet and an outlet for entrance and exit of an evaporating medium with said inlet being effectively connected to the boiler in a manner to receive the hot combustion gases leaving said boiler, and means within said evaporator operable to control within limits the proportion of the hot combustion gases flowing through the evaporator that contacts the moisture containing fuel.

4. An organization as defined in claim 3 wherein the means within the evaporator to control the proportion of hot combustion gases flowing through the evaporator that contacts the moisture contained fuel comprises at least one adjustable baffle located within the flow path of said hot combustion gases.

5. A chemical recovery unit for recovering chemicals from black liquor comprising a furnace in which said black liquor is burned, a boiler associated with said furnace to receive the hot combustion gases thus produced, means within said boiler operable to control the temperature of the hot combustion gases as they leave the boiler, conduit means for supplying black liquor to said furnace, a direct contact evaporator comprising a container connected into said conduit so that the black liquor flows through the lower portion thereof prior to entering said furnace, means for conveying the hot combustion gases leaving the boiler to the upper portion of said evaporator for passage therethrough, aond means disposed in said evaporator in the flow path of the hot combustion gases passing therethrough operable to vary the proportion of said gases that contacts the liquor contained therein.

6. A chemical recovery unit as defined in claim 5 wherein the means for varying the proportion of the gases that contacts the liquor comprises at least one baffle pivotally mounted adjacent the top of the evaporator container.

7. In combination a furnace, means for supplying black liquor fuel to said furnace, a boiler operatively connected to said furnace to receive the hot combustion gases generated therein converting a portion of the energy in said gases into steam, an evaporator operable to control the percentage of moisture contained in said black liquor supplied to the furnace, said evaporator comprising a housing forming a chamber, means connecting said housing into the fuel supply means so that the black liquor flows through said chamber and fills the same to a predetermined depth, at least one wheel disposed within and across said chamber and mounted for rotation about a generally horizontal axis with the uppermost portion of said wheel spaced a substantial distance from the top of said chamber and with the lower portion of said wheel dipping into the black liquor, means for rotating said wheel, said chamber having an inlet and outlet at opposite ends and adjacent the top thereof for the ingress and egress of hot gases, said inlet being effectively connected to said boiler for reception of hot combustion gases leaving the same, means controlling the evaporating capacity of said evaporator including adjustable baffle means within the boiler operable to vary the temperature of the hot combustion gases flowing through the evaporator and adjustable baffle means in said chamber operable to vary the proportion of the hot combustion gases flowing therethrough that contacts the black liquor.

8. The combination defined in claim 7 wherein the baffle means in the chamber comprises a first baffle located upstream of the wheel axis relative to the flow of hot combustion gases and a second baffle located downstream of said wheel axis with both of said baffles being pivoted about a generally horizontal axis located adjacent the top of the chamber.

9. A chemical recovery unit for recovering chemicals entrained in a moisture containing fluid fuel comprising a furnace in which said fuel is burned and said chemicals recovered, a boiler associated with said furnace to receive the hot combustion gases thus produced, conduit means associated with said furnace for supplying said fuel thereto, duct means connected to said furnace for supplying preheated combustion supporting air thereto, a direct contact evaporator operable to control the percentage of moisture contained in said fuel supplied to the furnace and including a container connected into said conduit so that the fuel flows through the lower portion thereof prior to entering the furnace, means for conveying the hot combustion gases leaving the boiler to the upper portion of said evaporator for passage therethrough, an air preheater connected in parallel with said last mentioned means and associated with said duct so as to preheat the air passing therethrough, means operable to control the proportion of said hot gases that pass through the air preheater and the proportion that pass directly through said conveying means into the evaporator and means disposed in said evaporator in the flow path of the hot combustion gases passing therethrough operable to control the proportion of said gases that contact the fluid fuel contained therein, said two control means being effective to control within limits the evaporation rate of said evaporator and the temperature of the hot gases leaving the evaporator.

10. In combination a furnace, means for supplying to said furnace a moisture containing liquid fuel having solids entrained therein, duct means for supplying combustion supporting air to said furnace, a boiler operatively connected to said furnace to receive the hot combustion gases generated therein converting a portion of the energy in said gases into steam, an evaporator operable to control the percentage of moisture contained in said fuel supplied to the furnace, said evaporator comprising a housing forming a chamber, means connecting said housing into the fuel supply means so that the fuel flows through said chamber and fills the same to a predetermined depth, said chamber being provided with an inlet and outlet adjacent the top thereof for ingress and egress of hot gases, means connecting said inlet to the outlet of the boiler for conveyance of the hot combustion gases leaving said boiler into said evaporator, an air preheater connected in by-pass relation with a portion of said last mentioned means and disposed in said duct means to preheat the combustion supporting air passing therethrough and means controlling both the evaporation rate of said evaporator and the temperature of the gases leaving the evaporator including adjustable baffle means within the boiler operable to vary the temperature of the hot combustion gases leaving said boiler, an adjustable damper operable to control the portion of the hot combustion gases leaving the boiler that flows directly to the evaporator and the portion that is by-passed through the air preheater, and adjustable baffle means in the evaporator chamber operable to vary the portion of hot combustion gases flowing therethrough that contacts the black liquor.

11. In a chemical recovery unit of the type described the combination of a boiler provided with a furnace, means for supplying a moisture containing fuel to said furnace including a direct contact evaporator effective to decrease the moisture content of said fuel, said evaporator having an inlet and an outlet for entrance and exit of an evaporator medium with said inlet being effectively connected to the boiler in a manner to receive the hot combustion gases leaving said boiler, means effective to regulate within limits the temperature of said gases entering said evaporator, and means within said evaporator operable to control within limits the proportion of the gases flowing through the evaporator that contacts the moisture containing fuel.

12. The method of recovering chemicals from black liquor in a recovery unit including a furnace, boiler and waste heat evaporator, comprising the steps of normally supplying black liquor of given low solid concentration to said waste heat evaporator; increasing the concentration of said black liquor in said evaporator to a given high value by normally delivering waste gases from said recovery furnace and boiler to said evaporator after said waste heat gases have passed over and among the heat absorbing surfaces of said boiler and passing said gases through said evaporator where a portion thereof contacts the black liquor therein picking up moisture therefrom; delivering said high concentration liquor into said recovery unit and boiler at a given rate; and maintaining the concentration of the liquor leaving said evaporator and being delivered into said furnace substantially constant and the temperature of the gases as they leave the evaporator within predetermined limits when the liquor supplied to the evaporator varies from said given low solid concentration by controllably by-passing hot waste gases in said boiler to increase the temperature of the waste gases delivered to said evaporator and by controllably directing a relatively greater portion of said gases passing through the evaporator into contact with the black liquor therein to thereby reduce the temperature of said gases prior to their egress from the evaporator when said liquor supply drops below said given low concentration and by controllably directing a greater proportion of the hot waste gases through all of the boiler gas passes to decrease the temperature of the waste gases delivered to said evaporator and by controllably directing a relatively greater proportion of the gases passing through the evaporator so that they by-pass the liquor therein to increase the temperature of the gases as they leave the evaporator when said liquor supply rises above said given low concentration.

13. The method of recovering chemicals from black liquor in a recovery unit including a furnace, boiler and waste heat evaporator, comprising the steps of normally supplying liquor at a given low solid concentration to said waste heat evaporator; increasing the concentration of said black liquor in said evaporator to a given high value by normally delivering waste heat gases from said recovery furnace and boiler to said evaporator after said waste heat gases have passed over and among the heat absorbing surfaces of said boiler; delivering said high concentration liquor into said recovery furnace and boiler at a given rate; and regulating within limits the evaporating rate of said evaporator by regulating the proportion of said waste heat gases leaving said recovery furnace and boiler that contact the liquor in said evaporator.

14. A chemical recovery unit for recovering chemical from black liquor comprising a furnace in which said black liquor is burned, a boiler associated with said furnace to receive the hot combustion gases thus produced, means within said boiler operable to control the temperature of the hot gases leaving the boiler, means for supplying said black liquor to said furnace including an evaporator through which a hot gaseous evaporating medium is passed, said evaporator being effectively interconnected with said boiler to receive as said evaporating medium hot combustion gases that have passed through the boiler, and means associated with said evaporator effective to control within limits the proportion of these gases that contact the liquor to be evaporated in said evaporator.

15. A chemical recovery unit for recovering chemicals from black liquor comprising a furnace in which said black liquor is burned, a boiler associated with said furnace to receive the hot combustion gases thus produced, means for supplying black liquor to said furnace including an evaporator through which a hot gaseous evaporating medium is passed and which is effective to increase the solid concentration in said liquor, means conveying the hot combustion gases generated in said furnace and passed through said boiler to said evaporator as said evaporating medium, adjustable means effective to control within limits the temperature of said gases conveyed to said evaporator and means effective to control within limits the proportion of these gases that contact the liquor to be evaporated in said evaporator.

16. In a chemical recovery unit of the type described the combination of a boiler provided with a furnace and having a number of serially interconnected parallel gas passageways for the passage of combustion gases therethrough and with heat exchange surface disposed therein, a by-pass interconnecting two adjacent passageways effective to by-pass at least a portion of the combustion gases from a substantial portion of the heat exchange surface in each of said adjacent passageways, adjustable valve means operative to control the effectiveness of said by-pass, means for supplying combustion supporting air to said furnace including an air heater connected to receive hot combustion gases leaving said boiler, a by-pass for said combustion gases with relation to said air heater, adjustable valve means in the last named by-pass operative to control the effectiveness thereof, means for supplying a moisture containing fuel to said furnace for burning therewithin, said last named means including a direct contact evaporator through which said fuel is conveyed and a portion of the moisture content removed therefrom, said evaporator being connected downstream of said air heater relative to combustion gas flow for receipt of said combustion gas as the evaporating medium and adjustable baffle means associated with said evaporator and constructed and arranged to vary the proportion of the combustion gases that contacts the fuel in the evaporator.

References Cited in the file of this patent

UNITED STATES PATENTS

| | | |
|---|---|---|
| 2,100,355 | Pray | Nov. 30, 1937 |
| 2,188,220 | Carlson | Jan. 23, 1940 |
| 2,213,052 | Rosencrants | Aug. 27, 1940 |
| 2,258,467 | Owens | Oct. 7, 1941 |
| 2,516,992 | Hochmuth | Aug. 1, 1950 |
| 2,522,905 | Smith | Sept. 19, 1950 |
| 2,583,145 | Hochmuth | Jan. 22, 1952 |

UNITED STATES PATENT OFFICE
CERTIFICATE OF CORRECTION

Patent No. 2,833,619                                    May 6, 1958

Vincent P. Owens

It is hereby certified that error appears in the printed specification of the above numbered patent requiring correction and that the said Letters Patent should read as corrected below.

Column 3, line 25, for the numeral "4" read -- 41 --; line 33, for the patent number "2,258,117" read -- 2,258,467 --.

Signed and sealed this 21st day of October 1958.

(SEAL)

Attest:

KARL H. AXLINE
Attesting Officer

ROBERT C. WATSON
Commissioner of Patents